(12) United States Patent
Hagerman et al.

(10) Patent No.: US 6,539,010 B1
(45) Date of Patent: Mar. 25, 2003

(54) DOWNLINK POWER CONTROL AND ADAPTIVE BEAMFORMING FOR HALF-RATE RADIOCOMMUNICATION SYSTEMS

(75) Inventors: Bo Hagerman, Stockholm (SE); Fredrik Jansson, Sundbyberg (SE); Thomas Östman, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/429,166

(22) Filed: Oct. 28, 1999

(51) Int. Cl.[7] ................................................. H04B 7/212
(52) U.S. Cl. ...................... 370/347; 370/468; 455/522; 455/561; 455/562
(58) Field of Search ................................ 370/311, 347, 370/442, 314, 328, 329, 336, 465, 468; 455/69, 522, 561, 562

(56) References Cited

U.S. PATENT DOCUMENTS

| | | | |
|---|---|---|---|
| 4,942,570 A | | 7/1990 | Kotzin et al. |
| 5,193,091 A | | 3/1993 | Crisler et al. |
| 5,559,807 A | * | 9/1996 | van den Heuvel et al. 370/95.3 |
| 5,757,787 A | * | 5/1998 | Dent ........................... 370/330 |
| 5,757,789 A | * | 5/1998 | Dent ........................... 370/337 |
| 5,825,758 A | | 10/1998 | Heikkinen et al. |
| 5,854,784 A | * | 12/1998 | Solve et al. ................. 370/311 |
| 5,917,826 A | | 6/1999 | Naessl et al. |

FOREIGN PATENT DOCUMENTS

| | | |
|---|---|---|
| AU | 4587496 | 9/1996 |
| WO | WO 95/09490 | 4/1995 |
| WO | WO 96/11533 | 4/1996 |
| WO | WO 9703403 | 1/1997 |
| WO | WO 98/33233 | 7/1998 |
| WO | WO99 52230 | 10/1999 |

* cited by examiner

*Primary Examiner*—Thanh Cong Le
*Assistant Examiner*—Tuan Tran

(57) ABSTRACT

A radiocommunication method and system which facilitates half-rate communications as well as downlink power control and selective beam transmission is described. Data associated with two terminals is multiplexed into a single timeslot. A first terminal's data occupies a first portion of the timeslot, while the second terminal's data occupies a second portion of the timeslot. A synchronization/training field may separate the first and second portions of the timeslot. In this way, a base station can change the power level and/or direction of transmission of the different terminal's data even though that data is multiplexed together on the same timeslot.

25 Claims, 6 Drawing Sheets

BIT INTERLEAVING

| A/B | C/D | E/F | A/B | C/D | E/F |
|-----|-----|-----|-----|-----|-----|
| 1 | 2 | 3 | 4 | 5 | 6 |

DOWNLINK POWER CONTROL AND ADAPTIVE BEAMFORMING FOR HALF-RATE RADIOCOMMUNICATION SYSTEMS

BACKGROUND

The present invention is directed generally to radiocommunication systems and, more particularly, to techniques and structures for transmitting and receiving downlink signals adapted to permit downlink power control and adaptive beamforming in conjunction with half-rate communications.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

In North America, digital communication and multiple access techniques such as TDMA are currently provided by a digital cellular radiotelephone system sometimes referred to as the digital advanced mobile phone service (D-AMPS), some of the characteristics of which are specified in the interim standard TIA/EIA/IS-54, "Dual-Mode Mobile Station-Base Station Compatibility Standard", published by the Telecommunications Industry Association and Electronic Industries Association (TIA/EIA), which is expressly incorporated herein by reference. Because of a large existing consumer base of equipment operating only in the analog domain with frequency-division multiple access (FDMA), TIA/EIA/IS-54 is a dual-mode (analog and digital) standard, providing for analog compatibility together with digital communication capability. For example, the TIA/EIA/IS-54 standard provides for both FDMA analog voice channels (AVC) and TDMA digital traffic channels (DTC). The AVCs and DTCs are implemented by frequency modulating radio carrier signals, which have frequencies near 800 megahertz (MHz) such that each radio channel has a spectral width of 30 kilohertz (Khz). The IS-54 standard has since been subsumed by the IS-136 standard, which also provides for digital control channels (DCCHs).

Figure 1:
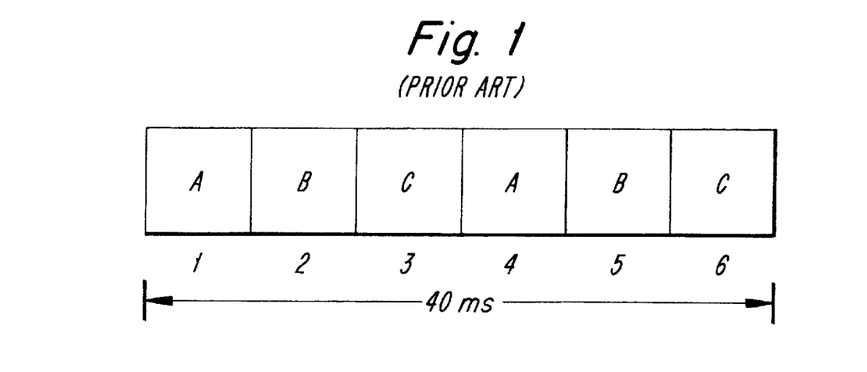
FIG. 1 depicts a conventional frame structure and DTC assignment.

In a TDMA cellular radiotelephone system, each radio channel is divided into a series of tinge slots, each of which contains a burst of information from a data source, e.g., a digitally encoded portion of a voice conversation. The time slots are grouped into successive TDMA frames having a predetermined duration. The successive time slots assigned to the same user, which are usually not consecutive time slots on the radio carrier, constitute the user's digital traffic channel, which may be considered a logical channel assigned to the user. Consider, for example, the exemplary IS-136 DTC frame structure illustrated in FIG. 1. Therein, it can be seen that one 40 ms frame consists of six timeslots.

Since being implemented, IS-136 systems have so far operated only at "full" rate. A full rate DTC according to IS-136 is two timeslots per frame, such that three user's can be assigned a full rate DTC on each carrier. Thus, for example, terminal A could be assigned a full rate DTC consisting of timeslots 1 and 4 in each frame, terminal B could be assigned a full rate DTC consisting of timeslots 2 and 5 in each frame and terminal C could be assigned a full rate DTC consisting of timeslots 3 and 6 in each frame on a single carrier frequency. However, other systems, e.g., systems operating in compliance with the GSM standard, provide for both full rate and half-rate communication service.

Figure 2:
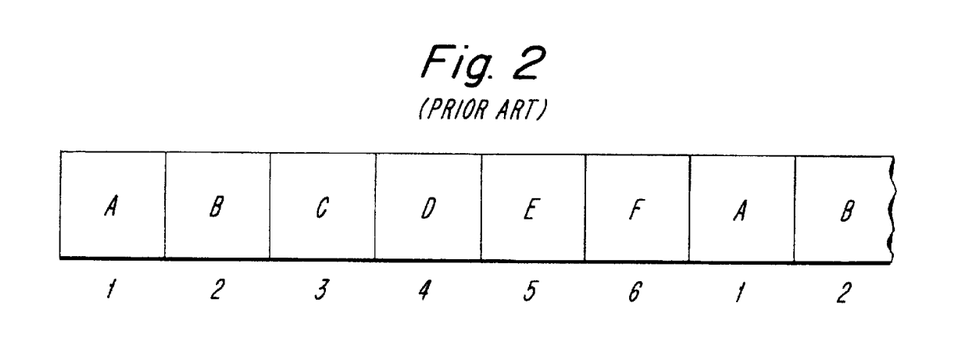
FIG. 2 illustrates a conventional technique for implementing half-rate communications using the frame structure of FIG. 1.

In order to meet the increasing demand for higher system capacity, efforts are now being made to implement half-rate operation in IS-136 systems. A straightforward way to provide half-rate communication service for IS-136 compliant systems is to assign each terminal to one timeslot per frame instead of two, as depicted in FIG. 2. There, each of terminals A-F are assigned one timeslot in each frame. A problem with this solution is that it doubles the delay associated with recovering speech frames in the receiver, e.g., from 40 ms to 80 ms (since each speech frame is interleaved over two timeslots to protect against slow fading).

Figure 3:
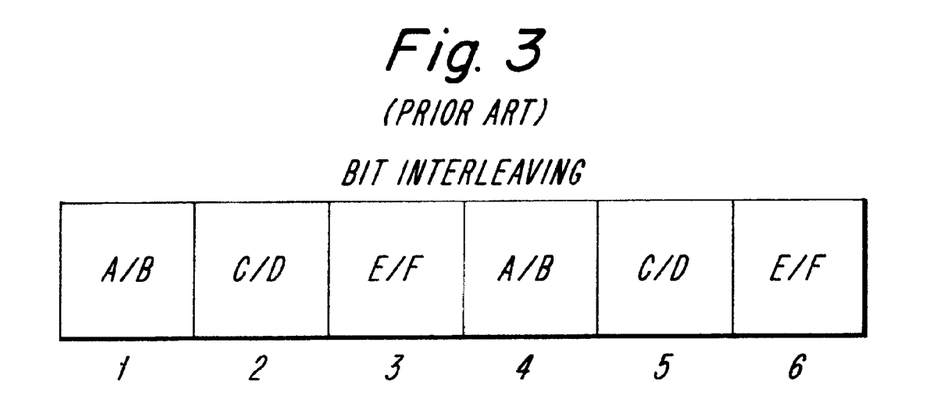
FIG. 3 depicts a conventional scheme for multiplexing two terminals in each timeslot using bit interleaving.

Another technique which has been proposed for providing half-rate communication service to IS-136 systems is to bit interleave data streams associated with two terminals in each timeslot. Thus, as conceptually illustrated in FIG. 3, data streams associated with terminals A and B are bit interleaved in both timeslots 1 and 4, data streams associated with terminals C and D are bit interleaved in both timeslots 2 and 5, and data streams associated with terminals E and F are bit interleaved in both timeslots 3 and 6. Bit interleaving refers to a form of interleaving wherein every other bit belongs to the same data stream, i.e., ABABABABAB . . . Although this solution reduces the delay associated with recovering speech frames in the receiver, it also has certain drawbacks.

Figure 4:
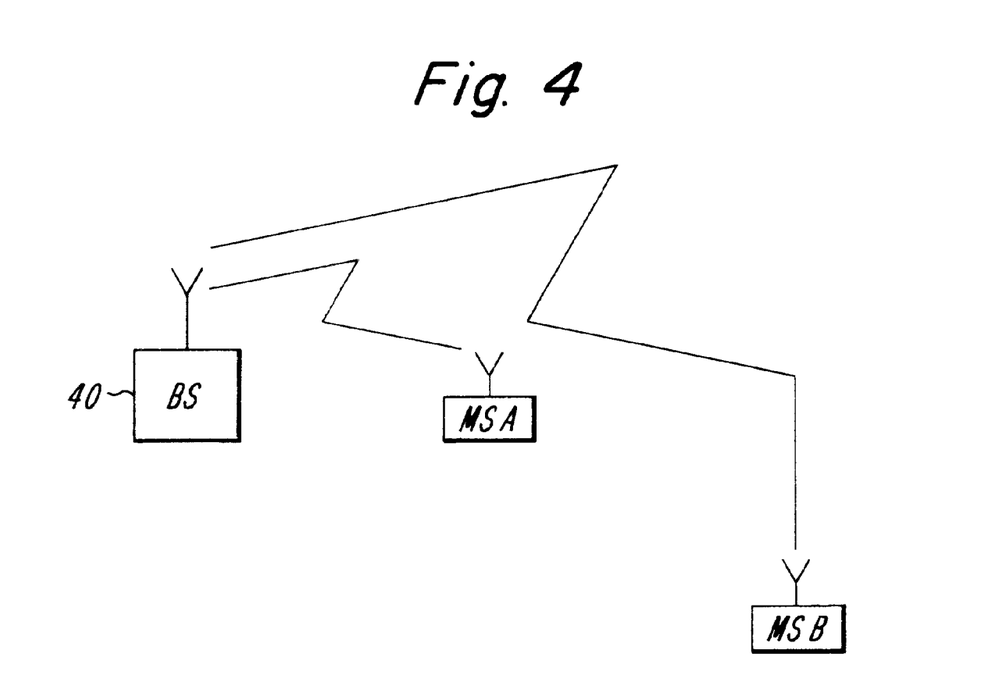
FIG. 4 is a block diagram representation of a base station transmitting to mobile stations which are disposed at different distances therefrom.

For example, it would be desirable, in future IS-136 compliant systems, to provide downlink power control. Currently, all timeslots on an IS-136 downlink carrier are transmitted at a constant power level by the base station. However, it is generally desirable to tailor the base station's transmit power for each connection to be only that which is necessary to provide a desired quality of service (QoS) as measured by, for example, a signal-to-noise ratio (SNR) experienced by a mobile station. For TDMA systems, downlink power control implies varying the power associated with transmissions to different mobile stations which are receiving signals in each frame. For example, as shown in FIG. 4, it may be desirable to transmit bits to mobile station A (which is relatively close to the base station 40) at a lower power level than those bits which are transmitted to mobile station B (which is more distant from the base station). However, if bit interleaving is used to enable half-rate communications, downlink power control would be precluded since the base station cannot ramp up/ramp down transmit power on a bit-by-bit basis.

Figure 5:
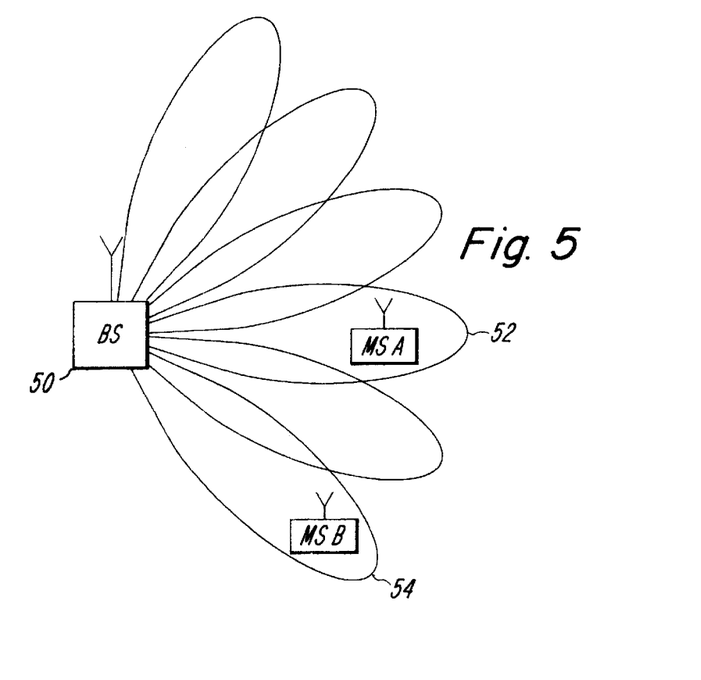
FIG. 5 is a block diagram representation of a base station transmitting to mobile stations located in different beams associated with an adaptive antenna array.

Another problem associated with bit interleaving is that it negates the adavantages which can be realized using adaptive beamforming. Array antennas are being provided to base stations in modern radiocommunication systems which antennas provide for spatial "steering" of signal energy in the direction of each recipient mobile. For example, as illustrated in FIG. 5, a base station 50 employing an array antenna can direct the downlink signal energy in one or more of a plurality of beams (only some of which are shown in FIG. 5). Thus, to minimize interference, it would be desirable to only transmit in beam 52 when sending mobile station A's bits and only transmit in beam 54 when sending mobile station B's bits. If, however, data streams associated with two mobile stations are bit interleaved within a timeslot for half-rate communications, it will not be possible to selectively transmit mobile station A's bits only in one or more beams directed toward mobile station A and selectively transmit mobile station B's bits only in one or more beams directed toward mobile station B.

Accordingly, it would be desirable to provide a communication technique, and systems associated therewith, which would enable half-rate communication in a manner which was also conducive to enabling downlink power control and/or selective transmission in the appropriate beam(s) using an adaptive array antenna.

SUMMARY

These and other drawbacks and limitations of conventional techniques and systems are overcome by exemplary embodiments of the present invention wherein data streams transmitted to multiple terminals are multiplexed in a manner which promotes downlink power control and adaptive beamforming. For example, in support of half-rate communications in an IS-136 compliant system, payload data associated with a first terminal can be provided in one or more data fields in a first half of a timeslot and payload data associated with a second terminal can be provided in one or more data fields in a second half of a timeslot. A synchronization/training field can be placed at or near the middle of the timeslot. This concept can be extended to multiplex more than two terminals in a timeslot, e.g., by grouping bits associated with a terminal's data stream in a portion of each timeslot.

Using timeslot formats according to the present invention provides the capability to multiplex multiple terminals in each timeslot and also provide downlink power control. For example, while a base station is transmitting a first portion of a timeslot to a first mobile station the base station can transmit with a first power level which is tailored to support the connection between the base station and the first mobile station. Then, when the base station is transmitting a second portion of the same timeslot to a second mobile station, the base station can transmit with a second power level (e.g., different than the first power level) which is tailored to support the connection between the base station and the second mobile station. Between the first and second portions of the timeslot, there may be a common synchronization/training/pilot field which can be used by both the first and second mobile stations to process their payload data in that timeslot and which, preferably, is therefore transmitted at the larger of the first and second power levels.

According to other exemplary embodiments of the present invention, multiple terminals can have payload information multiplexed in a single timeslot and selective transmission of signal energy in one or more beams associated with each terminal is also possible. Using an array antenna, a base station can determine a direction (or location) of a terminal which is transmitting on the uplink. Then, for example, while a base station transceiver is transmitting a first portion of a timeslot to a first mobile station the base station can transmit only in one or more beams associated with the first mobile station. Then, when the base station transceiver is transmitting a second portion of the same timeslot to a second mobile station, the base station can transmit signal energy only in one or more beams associated with the second mobile station. Between the first and second portions of the timeslot, there may be a common synchronization/training/pilot field which can be used by both the first and second mobile stations to process their payload data in that timeslot and which, preferably, is therefore transmitted in beams associated with both the first and second mobile stations.

These embodiments may, of course be combined such that the base station transceiver adjusts both its power level and beam steering depending upon, for example, the location of a mobile station to which it is transmitting in each timeslot.

BRIEF DESCRIPTION OF THE DRAWINGS

The foregoing, and other, objects, features and advantages of the present invention will be more readily understood upon reading the following detailed description in conjunction with the drawings in which:

FIG. 7(*a*) illustrates a conventional timeslot structure;

FIG. 7(*b*) depicts an exemplary timeslot structure according to the present invention;

FIGS. 10(*a*)–10(*c*) show an exemplary technique for selective beam transmission of data associated with different terminals which is multiplexed on the same timeslot according to an exemplary embodiment of the present invention

DETAILED DESCRIPTION

In the following description, for purposes of explanation and not limitation, specific details are set forth, such as particular circuits, circuit components, techniques, etc. in order to provide a thorough understanding of the invention. For example, various details are provided relating to exemplary TDMA timeslot structures. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 6:
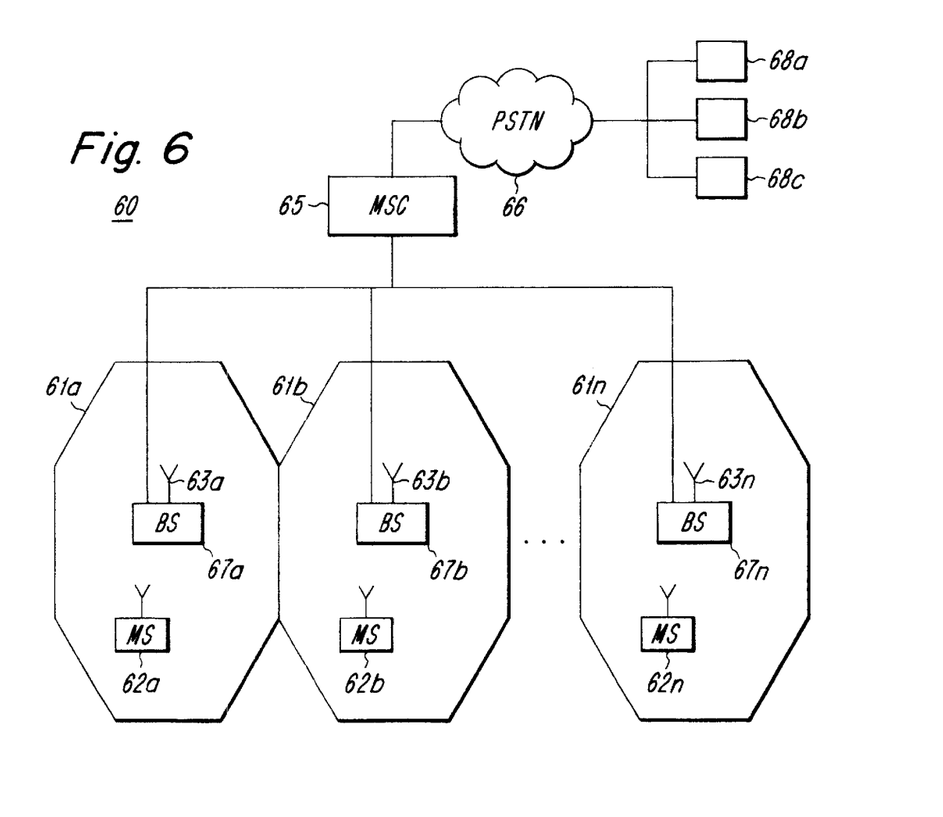
FIG. 6 depicts an exemplary radiocommunication system in which the present invention can be implemented.

FIG. 6 illustrates an example of a cellular radiocommunication system 60 in which the present invention can be implemented. The radiocommunication system 60 includes a plurality of radio base stations 67*a–n* connected to a plurality of corresponding antennas 63*a–n*. The radio base stations 67*a–n* in conjunction with the antennas 63*a–n* communicate with a plurality of mobile terminals (e.g. terminals 62*a*, 62*b* and 62*n*) within a plurality of cells 61*a–n*. Communication from a base station to a mobile terminal is referred to as the downlink, whereas communication from a mobile terminal to the base station is referred to as the uplink.

The base stations are connected to a mobile telephone switching office (MSC) 65. Among other tasks, the MSC coordinates the activities of the base stations, such as during the handoff of a mobile terminal from one cell to another. The MSC, in turn, can be connected to a public switched telephone network 66, which services various communication devices 68*a*, 68*b* and 68*c*.

The base stations 67*a–n* will typically include a plurality of transceivers each of which is capable of transmitting and receiving on at least one carrier frequency. A control processor (not shown) is also typically provided which processes information to be transmitted into bursts (timeslots). Each timeslot will have a particular format, i.e., a sequence of fields, which format is generally defined by the applicable air interface standard. For the purposes of these exemplary embodiments, timeslot structures associated with the IS-136 standard are discussed, however those skilled in the art will appreciate that the present invention is applicable to different types of timeslot structures and to systems operating in accordance with different radiocommunication standards.

In order to increase the gross bit rate available over the air interface, it has recently been proposed to introduce a new type of modulation for signals transmitted in radiocommunication systems operating in accordance with IS-136. Specifically, the originally standardized differential quadrature phase shift keying (DQPSK, 2 bits/symbol)) is being replaced with eight bit phase shift keying (8-PSK, 3 bits/symbol), thereby providing a 50% higher bit rate. Naturally, corresponding changes in the timeslot structure have been proposed since more bits/timeslot can be transmitted using the 8-PSK modulation. One proposal for the new downlink timeslot structure is depicted as FIG. 7(a).

Figure 7A:
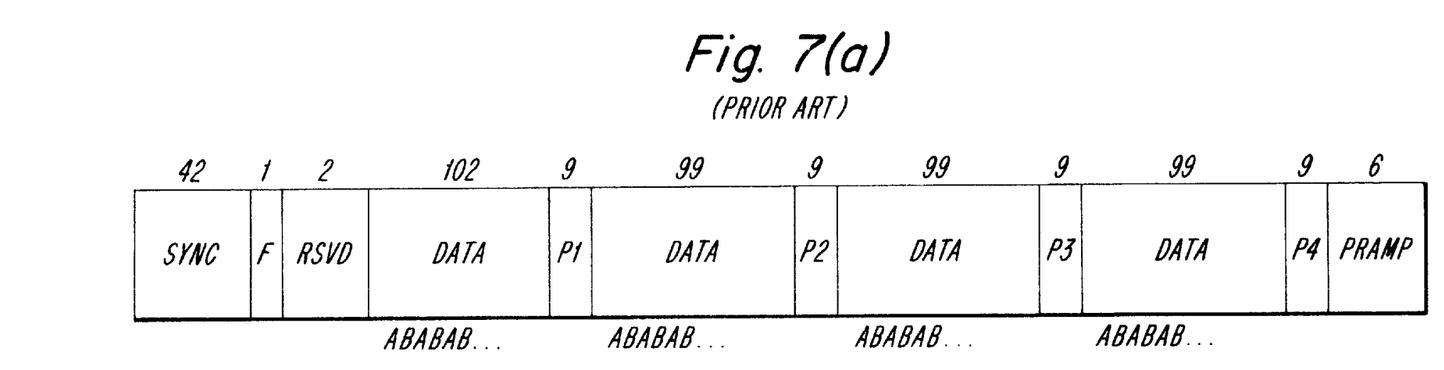

Therein, the first field in the timeslot is a SYNC field which may contain a known pattern used, e.g., for frame synchronization and training of an equalizer or channel estimator. Note that the numbers above each field in the figure represent the number of bits in each field. Following the SYNC field, is the F field which can be used for fast power control:, i.e., informing the mobile station whether it should adjust its transmit power on the uplink. Next, is a reserved field (RSVD), followed by a first payload data field (DATA). Following the first DATA field is a first pilot field P1. Since the phase difference between 8-PSK modulated symbols is less than the phase difference between DQPSK symbols, 8-PSK symbols are inherently more sensitive to noise than DQPSK symbols. To combat the noise sensitivity of 8-PSK modulated symbols, coherent demodulation can be used to provide a processing gain, which demodulation needs a phase reference. Thus, the proposed timeslot structure for 8-PSK transmissions includes a number of pilot symbol fields P1–P4, interspersed among the four DATA fields, which provide the needed phase reference for coherent demodulation. At the end of the timeslot is a power ramping field which provides time for the transceiver to adjust its transmit power level.

In addition to a new modulation and new timeslot structure, half-rate communication capability is also desired. To provide half-rate communications, while also providing acceptable delay and interleaving protection against burst errors, bit interleaving of two half-rate terminals in each timeslot has also been proposed. As shown in FIG. 7(a), and as mentioned above, this means that in each of the four data fields in a timeslot, the data streams intended for two terminals (here, terminals A and B) would be interleaved on a bit-by-bit basis. However, bit interleaving does not permit the radiocommunication system to also provide downlink power control and/or selective beam transmissions.

Thus, the exemplary embodiments of the present invention provide for a different manner of interleaving the data streams intended for different terminals. More specifically, the bits to be transmitted to a first terminal are placed in one or more fields in a first portion of the timeslot, while the bits to be transmitted to a second terminal are placed in one or more fields in a second portion of the timeslot. By organizing the transmission of information in this manner, both downlink power control and selective beam transmission of the separate bit streams becomes feasible. As an initial (but purely illustrative) example of such a timeslot structure according to the present invention, consider FIG. 7(b). Therein, it can be seen that the first terminal's data stream (A) is disposed in the first two DATA fields, while the second terminal's data stream (B) is disposed in the second two DATA fields. Additionally, the SYNC field has been moved such that it is located between the payload bits being transmitted to the first terminal and the payload bits being transmitted to the second terminal. An additional pair of F and RSVD fields have been added after the SYNC field, since the first F and RSVD fields may not be receivable by the second terminal.

Figure 7B:
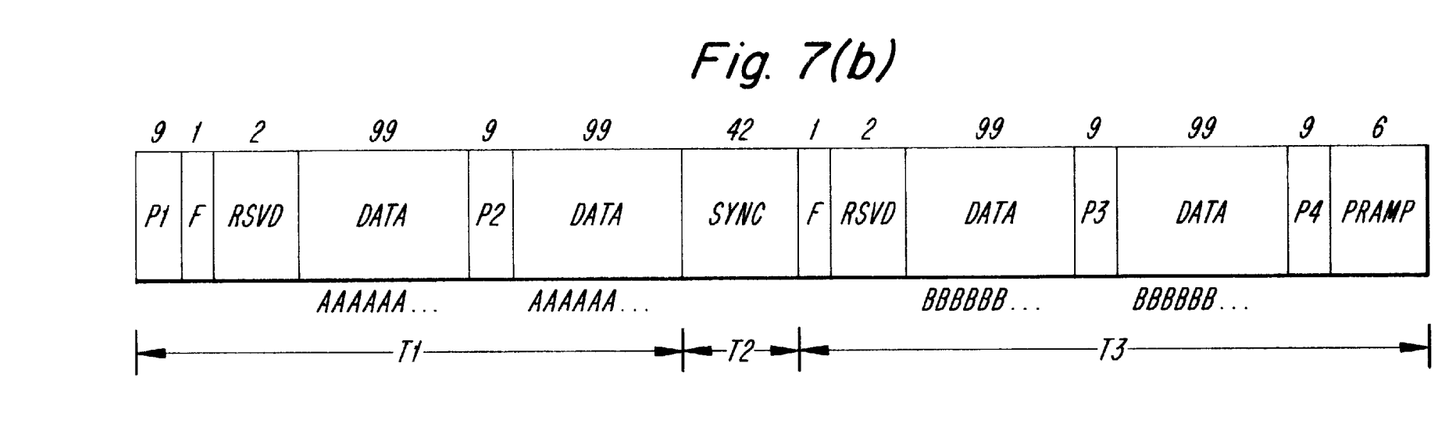
Figure 8:
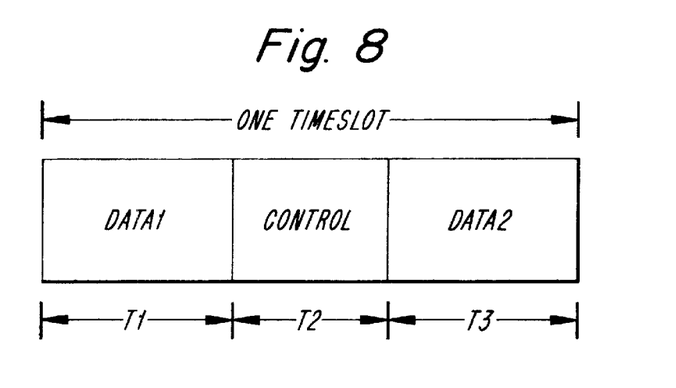
FIG. 8 depicts another exemplary timeslot structure according to the present invention.

Of course, those skilled in the art will appreciate that the rather detailed timeslot structure of FIG. 7(b), including specific bit allocations for the various fields, is purely exemplary and that many other timeslot structures can be used in accordance with the present invention. More generally, as seen in FIG. 8, a timeslot structure in accordance with the present invention separates data bits being transmitted to a first terminal from data bits being, transmitted, in the same timeslot, to a second terminal to promote downlink power control and selective beam transmission, as will be described below. Preferably certain control information, e.g., synchronization/training patterns, pilot symbols, etc., may be disposed in one or more fields between the different terminals' data bits, e.g., such that both the first and second terminals can make reasonably accurate estimates of the channel for use in decoding the received bits. However, the location and size of this control field may also be varied.

Figure 9:
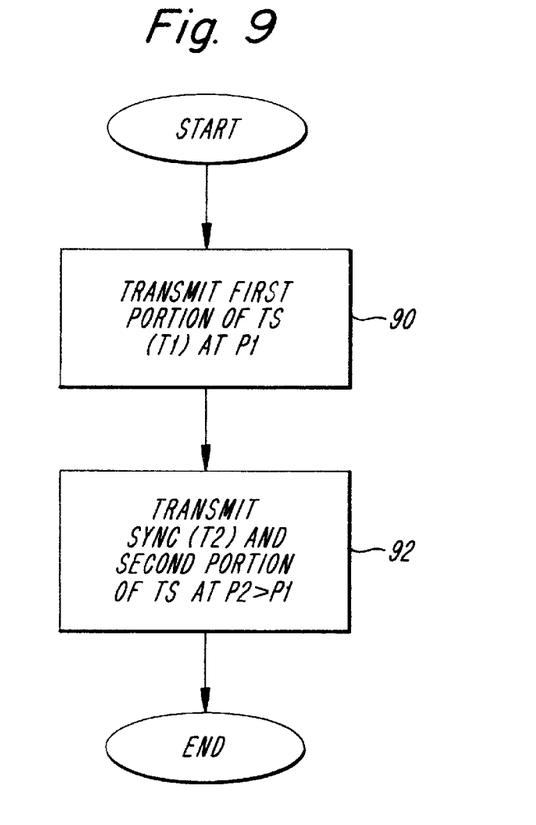
FIG. 9 is a flowchart illustrating a downlink power control method of data associated with different terminals which is multiplexed on the same timeslot according to an exemplary embodiment of the present invention.

Transmitting multiplexed information using this type of timeslot structure permits base stations according to the present inventon to employ downlink power control and/or selective beam transmisson as follows. Using the time periods T1, T2 and T3 (in either FIG. 7(b) or FIG. 8), downlink power control can be performed as illustrated in the flowchart of FIG. 9. In this example it is assumed that the first portion of the timeslot is being used to communicate bits at a lower power level P1 (e.g., to MS A in FIG. 4) than the second power level P2 (e.g., to the more distant MS B). Therein, at step 90, the base station begins to transmit the first portion of the timeslot (TS) at power level P1. At the end of time T1, and prior to transmitting the SYNC field, the base station gradually ramps up its transmit power to power level P2 so that both terminals can accurately receive the SYNC field. Then, for the remainder of the timeslot (T2+T3), the base station transmits information at the higher power level P2. In this way, overall interference is reduced since the base station need not transmit at the higher power level P2 throughout the timeslot.

Of course it is possible that the first portion of the timeslot will carry data that requires more power for transmission than the data to be transmitted in the second portion of the timeslot. In such a case, the base station would trait at the higher power level for T1+T2, gradually ramp its power down to the lower power level, and then transmit the remainder of the timeslot during T3.

Figure 10A:
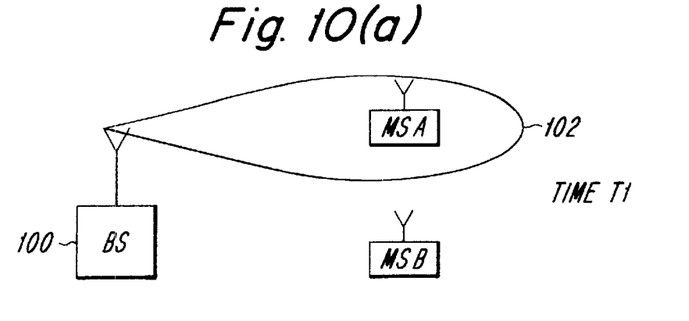
Figure 10B:
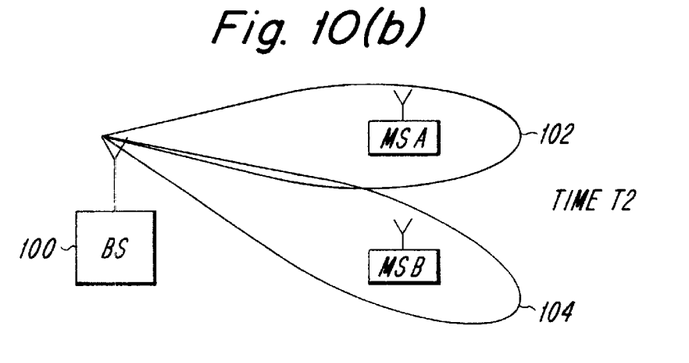
Figure 10C:
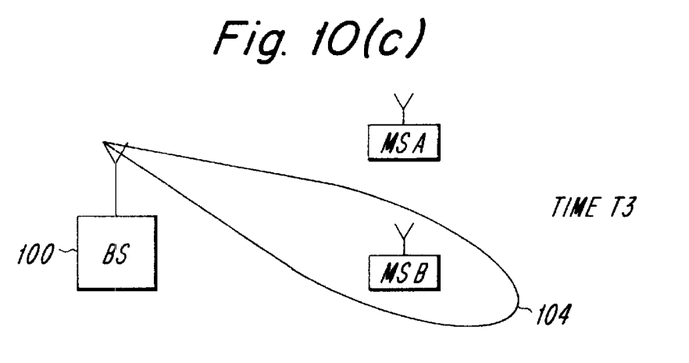

According to another exemplary embodiment of the present invention, if the base station has an adaptive antenna array which permits selective beam transmission, the base station can spatially steer the portions of each timeslot toward a corresponding terminal. Consider FIGS. 10(a)–10(c), wherein a base station 100 is transmitting downlink information to two terminals in the same timeslot, e.g., using the timeslot structures of FIG. 7(b) or FIG. 8. First, during time period T1, the base station 100 transmits signal energy only in the beam 102. Next, during time period T2, the base station transmits the SYNC field to both terminals by transmitting the signal energy in both beams 102 and 104. Then, during time period T3, the base station 100 only transmits signal energy in beam 104. Although only one beam is illustrated as being associated with each terminal in this example, those skilled in the art will appreciate that the base station 100 can transmit in multiple beams to each terminal, e.g., during periods of macrodiversity/soft handoff. As in the downlink power control embodiment, this ability to selectively transmit in particular beams during a timeslot reduces overall interference since the base station 100 need not transmit all of the information in each timeslot in both beams 102 anti 104, as would be the case if bit interleaving was used.

The present invention has been described in terms of specific embodiments to facilitate understanding. The above embodiments, however, are illustrative rather than restrictive. For example, although described separately above, the downlink power control techniques and selective beam transmission techniques can be used together. It will be readily apparent to one skilled in the art that departures may be made from the specific embodiments shown above without departing from the central spirit and scope of the invention. Therefore, the invention should not be regarded as being limited to the above examples, but should be regarded instead as being commensurate in scope with the following claims including equivalents thereof.

What we claim is:

1. A method for communicating information to first and second terminal devices in a radiocommunication system comprising the steps of:
   (a) transmitting, in a first portion of a timeslot, information associated with said first terminal device at a first power level; and
   (b) transmitting, in a second portion of said timeslot, information associated with said second terminal device at a second power level different than said first power level.

2. The method of claim 1, her comprising the step of:
   (c) transmitting, in a third portion of said timeslot, a control field which is to be used by both said first and second terminal devices.

3. The method of claim 2, wherein said control field includes at least one of a synchronization field, an equalization training field, and a pilot symbol field.

4. The method of claim 2, wherein said third portion of said timeslot is disposed between said first and second portions.

5. The method of claim 2, wherein said control field is transmitted at a greater of said first and second power levels.

6. A base station comprising:
   a transceiver for transmitting information in timeslots, wherein information associated with a first terminal device and information associated with a second terminal device are transmitted in different portions of a single timeslot; and
   a power control device for selecting a power level associated with transmissions by said transceiver, wherein said information associated with said first terminal device is transmitted at a first power level and said information associated with said second terminal device is transmitted at a second power level which is different than said first power level.

7. The base station of claim 6, wherein said transceiver further transmits a control field usable by both said first terminal and said second terminal.

8. The base station of claim 7, wherein said control field includes at least one of a synchronization field, an equalization training field, and a pilot symbol field.

9. The base station of claim 7, wherein said control field is disposed between said information associated with said first terminal and said information associated with said second terminal.

10. The base station of claim 7, wherein said transceiver transmits said control field at a greater of said first and second power levels.

11. A method for communicating information to first and second terminal devices in a radiocommunication system comprising the steps of:
   (a) transmitting, in a first portion of a timeslot, information associated with said first terminal device in a first beam of an array antenna; and
   (b) transmitting, in a second portion of said timeslot, information associated with said second terminal device in a second beam of said array antenna, which second beam is different than said first beam.

12. The method of claim 11, further comprising the step of:
   (c) transmitting, in a third portion of said timeslot, a control field which is to be used by both said first and second terminal devices.

13. The method of claim 12, wherein said control field includes at least one of a synchronization field, an equalization training field, and a pilot symbol field.

14. The method of claim 12, wherein said third portion of said timeslot is disposed between said first and second portions.

15. The method of claim 12, wherein said control field is transmitted in both of said first and second beams.

16. The method of claim 11, wherein step (a) further comprises transmitting the information associated with said first terminal device in at least one other beam of the array antenna.

17. The method of claim 11, wherein step (b) further comprises transmitting the information associated with said second terminal device in at least one other beam of the array antenna.

18. A base station comprising:
   a transceiver for transmitting information in timeslots, wherein information associated with a first terminal device and information associated with a second terminal device are transmitted in a single timeslot; and
   an antenna array associated with said transceiver capable of transmitting said information in at least one of a plurality of beams, wherein said information associated with said first terminal device is transmitted in a first beam and said information associated with second terminal device is transmitted in a second beam different than said first beam.

19. The base station of claim 18, wherein said transceiver further transmits a control field usable by both said first terminal and said second terminal.

20. The base station of claim 19, wherein said control field includes at least one of a synchronization field, an equalization training field, and a pilot symbol field.

21. The base station of claim 19, wherein said control field is disposed between said information associated with said first terminal and said information associated with said second terminal.

22. The base station of claim 19, wherein said transceiver transmits said control field in both of said first and second beams.

23. A method for communicating information to first and second terminal devices in a radiocommunication system comprising the steps of:
  (a) transmitting, in a first portion of a timeslot, only information associated with said first terminal device;
  (b) transmitting, in a second portion of said timeslot subsequent to said first portion, an overhead field to both said first and second terminal devices; and
  (c) transmitting, in a third portion of said timeslot, only information associated with said second terminal device.

24. The method of claim 23, further comprising the step of: changing a power level associated with said transmitting steps (a) and (c).

25. The method of claim 23, further comprising the steps of:
  directing signal energy associated with step (a) to a first array antenna beam; and
  directing the signal energy associated with step (c) to a second array antenna beam.

* * * * *